United States Patent [19]

Shinohara

[11] Patent Number: 5,687,346

[45] Date of Patent: Nov. 11, 1997

[54] PC CARD AND PC CARD SYSTEM WITH DUAL PORT RAM AND SWITCHABLE REWRITABLE ROM

[75] Inventor: Takayuki Shinohara, Itami, Japan

[73] Assignee: Mitsubishi Denki Kabushiki Kaisha, Tokyo, Japan

[21] Appl. No.: 535,639

[22] Filed: Sep. 28, 1995

[30] Foreign Application Priority Data

Sep. 30, 1994 [JP] Japan ..................... 6-237858

[51] Int. Cl.⁶ ................................. G06F 13/00
[52] U.S. Cl. ............... 395/430; 395/200.08; 395/280; 395/311; 395/442; 395/458; 395/476; 364/DIG. 1
[58] Field of Search ............. 395/200.08, 280, 395/311, 430, 442, 458, 476

[56] References Cited

U.S. PATENT DOCUMENTS

| | | | |
|---|---|---|---|
| 5,359,570 | 10/1994 | Hsu et al. | 365/230.01 |
| 5,537,558 | 7/1996 | Fletcher et al. | 395/309 |
| 5,544,087 | 8/1996 | Nakajima et al. | 364/443 |
| 5,574,929 | 11/1996 | Pieterse et al. | 395/800 |

*Primary Examiner*—Frank J. Asta
*Attorney, Agent, or Firm*—Leydig, Voit & Mayer, Ltd.

[57] ABSTRACT

The present invention relates to a PC card comprising: a CPU; a memory storing an operating program for said CPU; interface means connected to a host system for performing configuration under the control of said host system and exchanging data with said host system; and a dual port RAM connected between said CPU and said interface means for storing at a time all of data inputted from and outputting to said host system through said interface means, wherein said data being accessed sequentially by said CPU. This invention resides in a PC card system comprising the PC card and a host system.

8 Claims, 6 Drawing Sheets

PC CARD AND PC CARD SYSTEM WITH DUAL PORT RAM AND SWITCHABLE REWRITABLE ROM

BACKGROUND OF THE INVENTION

1. Field of the Invention

The present invention relates to a PC card and, more particularly, to a PC card incorporating a CPU. The present invention also relates to a PC card system.

2. Description of the Related Art

The use of external memory media for electronic equipment such as personal computers, and card-shaped devices for realizing I/O functions, PC cards, which include memory cards and I/O cards, have become widespread. A PC card 1, as shown in FIG. 5, is usually inserted into a PC card slot 102, and is electrically connected through a connector 1a to internal circuits (not shown) in a host system 100 such as a personal computer. Recently, standardization of specification for the PC card 1 has been continued mainly by JEIDA (Japan Electronic Industry Development Association) in Japan and PCMCIA (Personal Computer Memory Card International Association) in the USA (See JEIDA: PC Card Guideline Ver. 4.2, and PCMCIA: PC Card Standard Rel 2.1).

FIG. 6 is a block diagram illustrating the structure of a known PC card 1 for realizing I/O functions based on these standard specifications. As shown in FIG. 6, the above-described connector 1a of the PC card 1 is provided with 68 pins of socket contacts (not shown). These contacts are used as an address bus 2 where address data is input from the host system 100, a control bus 3 where control signals are input, a data bus 4 for exchanging data with the host system 100, and the like. In addition, a PC card interface circuit 5 is disposed in the PC card 1 in order to realize the standardized PC card interface. The PC card interface circuit 5 is comprises an attribute memory 6, a card configuration register 7, and an address decoder 8. The attribute memory for 6 is a memory storing attribute information such as various functions (memory functions, I/O functions, and the like) of the PC card 1 in a table, i.e. the functions that can be set. In addition, the card configuration register 7 is a register for initializing an I/O register 9 which will be described later. The connector 1a and PC card interface circuit 5 comprise interface means for performing configuration of the PC card 1 under the control of the host system 100 and exchanging data with the host system 100 (namely, performing inputting data from and outputting data to the host system 100).

The I/O register 9 is connected to the PC card interface circuit 5 and data bus 4, and to a card inner bus 11 that is provided in the PC card 1, as shown in FIG. 6. In addition, a CPU 12 controlling I/O functions, ROM 13 storing instruction codes (operating program) for operating the CPU 12, RAM 14 storing data, an I/O port 15 for communicating with external equipment (not shown) such as communication equipment are connected to the card inner bus 11. The I/O port 15 is connected to an external communication line 104 provided in the above-described external equipment for communication through a back connector 16 which is mounted at the opposite side of the connector 1a.

The operation of a PC card and a PC card system is described below. In a known PC card that is constructed as described above, based on the procedure defined in the standard specification, an initialization generally known as a "configuration" is performed. Hereinafter, the case where the PC card 1 is configured so as to be able to perform I/O functions will be described. First, the host system 100 accesses the PC card 1, and in detail, to the attribute memory 6 through the address bus 2, control bus 3, and data bus 4 to read attribute information from the PC card 1. In addition, based on the content of the attribute information, the host system 100 selects a function that the host system 100 wants to execute, that is, the I/O functions. Additionally, the host system 100 initializes the I/O register 9 through the address decoder 8 by using the configuration register 7. Thereby, the host system 100 is connected to the card inner bus 11 through the I/O register 9, and the PC card 1 is configured so as to be able function as an I/O card.

Once the PC card 1 is configured, the PC card responds only to the I/O access to the address in the I/O register 9 which the host system 100 designates. Specifically, when the host system 100 sets parameters and inputs a command to each address in the I/O register 9 which is designated in the address bus 2, the CFU 12 starts processing according to the parameters and the command. Until the CPU 12 completes the processing, the PC card 1 continues to send a busy signal, to the host system 100 using a status register (not shown), which indicates that the PC card 1 is in a busy state. The status register may be provided, for example, in the I/O register 9. When the CPU 12 completes the processing, it generates an interrupt signal to the host system 100 to request the next process. For example, if the command input to the I/O register 9 requires data, first, the CPU 12 executes the command so as to determines whether the command requires data, while sending the busy signal to the host system 100. In addition, the CPU 12 generates an interrupt signal to the host system 100, and requests the data from the host system 100. In this time, after a host CPU (not shown) in the host system 100 outputs the command, the host CPU needs to wait the data output until the CPU 12 execute the command and requests the data.

Regarding a known PC card, as described above, its I/O access speed depends on the processing speed of the CPU 12 in the PC card 1. Therefore, the known PC card has a problem in that the host CPU (not shown) in the host system 100 needs to wait until the CPU 12 completes processing.

In addition, in a known PC card, even in the case that later or updated versions of software in the PC card 1 become necessary, there are only two options, one of which is to change the PC card to the new one, the other of which is to exchange the built-in ROM 13 by dismantling the PC card 1. This inconvenience results from the fact that contents of the ROM 13 storing the software in the PC card, that is, instruction codes (operating program) for the CPU 12 can be written only in a manufacturing step, but it is impossible to rewrite the contents after shipping. Therefore, the known PC card has another problem that updating of the software is not easy.

SUMMARY OF THE INVENTION

The present invention provides a solution to the above described problems. Accordingly, an object of the present invention is to provide a PC card and PC card system in which it is possible to input to a PC card all of the information necessary for I/O operation at one time while making the I/O access speed between a host system and the PC card independent from the processing speed of a CPU in the PC card, and consequently, to provide the PC card and PC card system having upgraded processing speed as a whole system. Moreover, another object of the present invention is provide a PC card and a PC card system that can realize easy updating of software in the PC card without dismantling the PC card.

In accordance with a first aspect, the present invention is directed to a PC card and a PC card system. The PC card and PC card system comprises a CPU, a memory storing an operating program for the CPU an interface means connected to a host system for performing configuration under the control of the host system and performing data input from and data output to the host system, and dual port RAM connected between the CPU and interface means for storing all of the data input from or output to the host system through the interface means at a single time, the data being accessed sequentially by the CPU.

In accordance with a second aspect, the present invention is directed to a PC card and a PC card system. The PC card and PC card system comprising memory composed of nonvolatile memory that is rewritable, and dedicated rewriting means connected between the memory and the interface means for rewriting the operating program under the control of the host system.

In accordance with a third aspect, the present invention is directed to a PC card and a PC card system. The PC card and PC card system comprising switching means connected between the dedicated rewriting means and memory for switching between connecting/disconnecting (make and break of connection) between the dedicated rewriting means and the memory.

In accordance with a fourth aspect, the present invention is directed to a PC card and a PC card system. The PC card and PC card system comprises first switching control signal output means for outputting a switching control signal to the switching means under the control of the host system.

In accordance with a fifth aspect, the present invention is directed to a PC card and a PC card system. The PC card and PC card system comprising input means for receiving an external signal input from the outside, and second switching control signal output means for outputting a switching control signal to the switching means according to the external signal input to the input means.

According to a sixth aspect of the present invention, a PC card is provided with a back connector that includes input means.

In the first aspect of the present invention that is constructed as described above, when the host system inputs all of the information necessary for one I/O operation to the dual port RAM at a time, processing of the I/O operation is transferred to the CPU in the PC card. The CPU in the PC card sequentially accesses the dual port RAM received the information, and advances processing while reading the information necessary for the I/O operation. In this time, since the host system has already input all of the information necessary for one I/O operation to the dual port RAM, the host system can move to another process without waiting processing completion of the CPU in the PC card.

In the second aspect of the present invention, since the memory storing the operating program for the CPU in the PC card comprises the nonvolatile memory that is electrically rewritable, the operating program can be rewritten with the dedicated rewriting means under the control of the host system without dismantling the PC card even if an updated version of the operating program for the CPU becomes necessary after shipping.

BRIEF DESCRIPTION OF THE DRAWINGS

The present invention will become more readily apparent from the following detailed description of the preferred embodiments of the present invention taken in conjunction with the accompanying drawings, in which.

DETAILED DESCRIPTION OF THE PREFERRED EMBODIMENTS

EMBODIMENT 1

Figure 1:
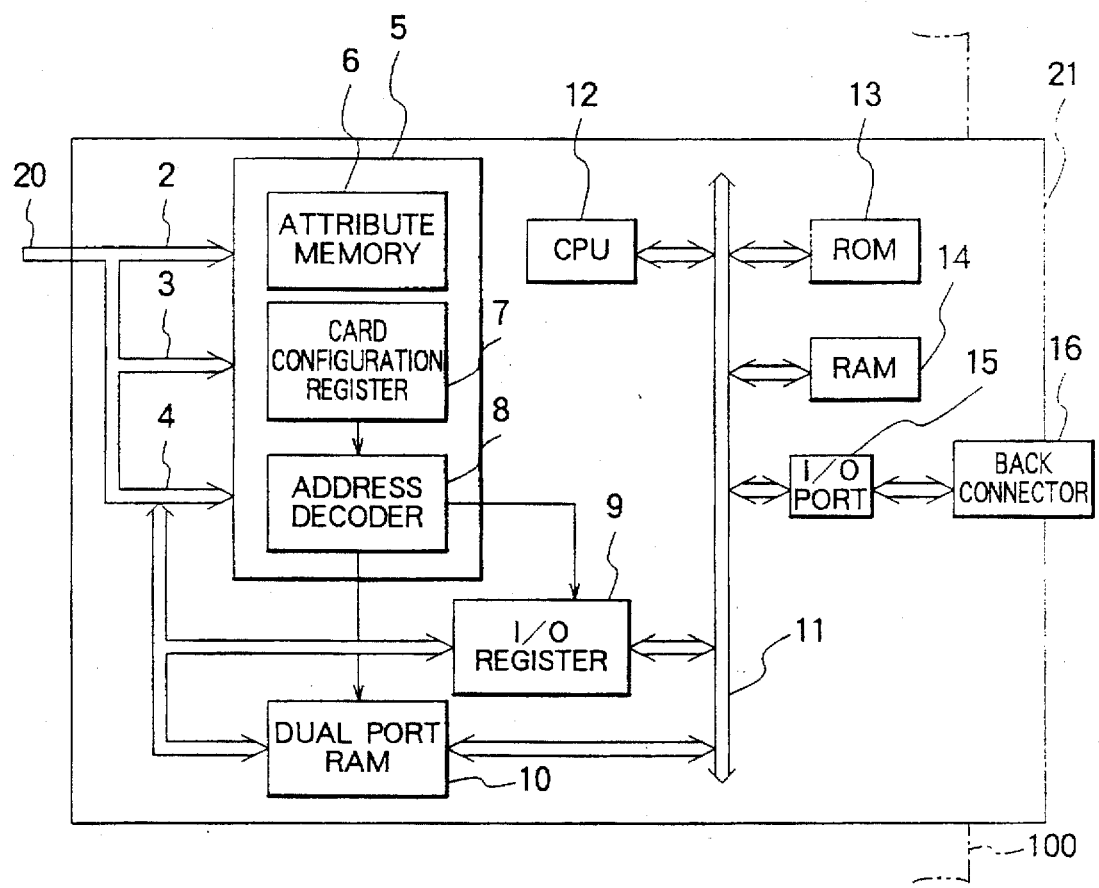
FIG. 1 is a block diagram showing the structure of a PC card according to a first embodiment of the present invention.
Figure 6:
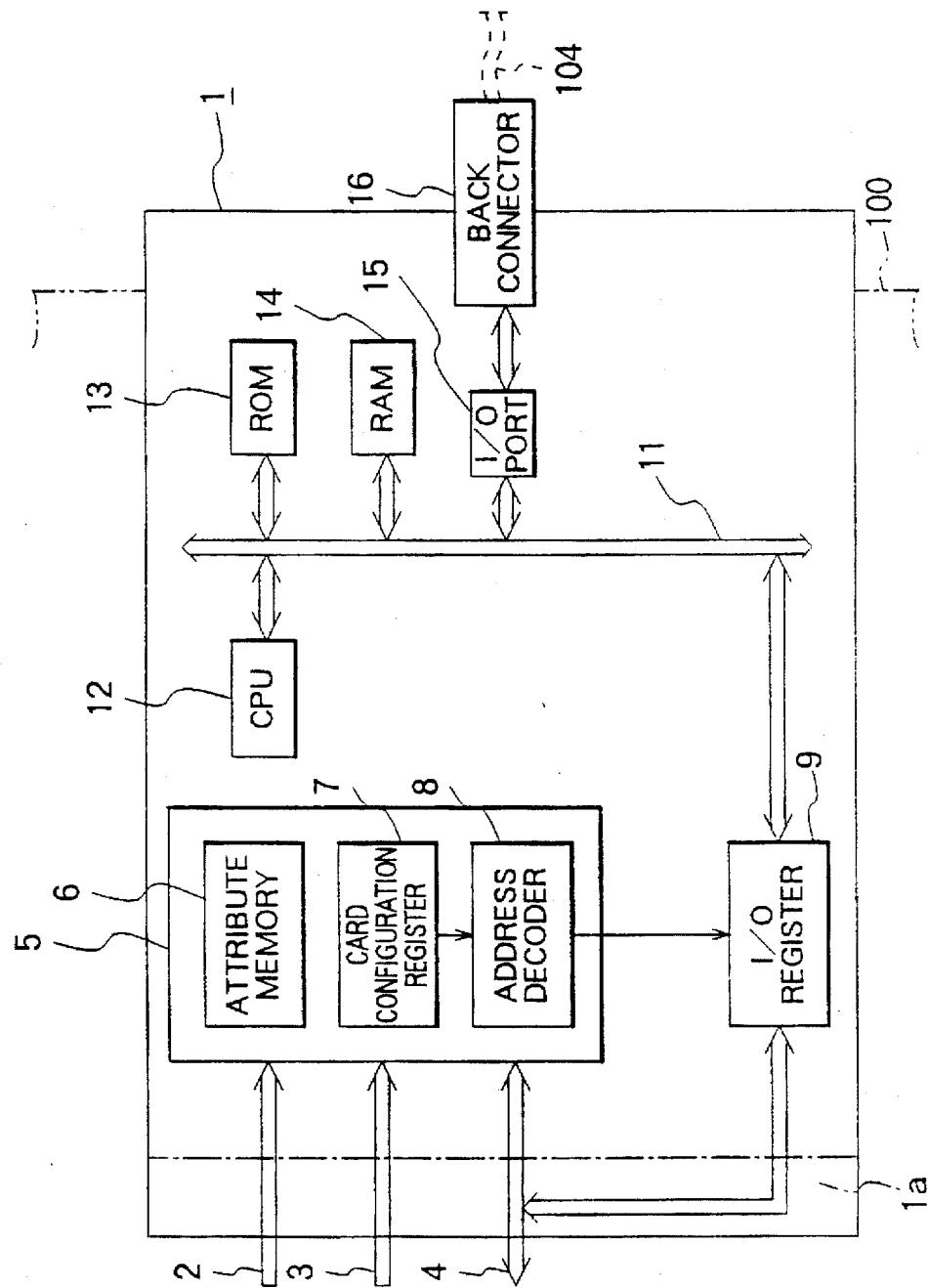
FIG. 6 is a block diagram showing the structure of a privately known PC card.

Hereinafter, an embodiment of the present invention will be described with reference to the drawings. FIG. 1 shows a block diagram of a PC card according to one embodiment of the present invention. In this embodiment, a dual port RAM 10 is provided. The dual port RAM 10 can be accessed by a host CPU via a bus 20 comprising an address bus 2, a control bus 3, and a data bus 4, and also be accessed by a PC card inner bus 11. Here, the host CPU bus 20 is connected to 68 pins of socket contacts (not shown) provided in the connector 1a as shown in the known example for connecting a host CPU (not shown) in a host system 100 to a PC card 21. In addition, in this embodiment, similar to the known example (FIG. 6), the connector 1a and a PC card interface circuit 5 also comprise interface means for configuring the PC card 1 under the control of the host system 100 and performing the input and output of data between the host system 100 and PC card 21. The other components are the same as those in the known example (FIG. 6), and hence description regarding them is omitted.

Similarly to the known example, when the PC card 21 is configured as an I/O card, I/O access through an I/O register 9 becomes available. However, as described above, I/O access speed through the I/O register 9 is limited by the processing speed of the CPU 12, and this causes the problem that the host CPU (not shown) in the host system 100 needs to wait during the processing time of the CFU 12. Therefore, in this embodiment, the dual port RAM 10 is provided between the host CPU bus 20 and the card inner bus 11. The RAM can be accessed by both of the host CPU (not shown) in the host system 100 and the CPU 12 in the PC card 21. Accordingly, the dual port RAM 10 makes it possible to receive set values of all of the parameters, command input, and data input in one high-speed write cycle, which are necessary for an I/O function requested by the host system 100, without depending on the processing speed of the CPU 12.

Operation of this embodiment is described below. First, the PC card 21 is configured by the PC card interface circuit 5 so that the PC card 21 may perform an I/O operation using the dual port RAM 10. When all of the information such as set values of parameters, command input, and data input, which are necessary for one I/O operation are input from the host CPU (not shown) in the host system 100 to the dual port RAM 10, processing of the I/O operation is transferred to the CPU 12. The CPU 12 sequentially accesses the dual port RAM 10 according to the instruction codes in a ROM 13, and advances and executes processing while reading the information necessary for the I/O operation. During the processing operation of the CPU 12, the PC card 21 remains busy. However, since the host system 100 has already input all of the information necessary for one I/O operation to the dual port RAM 10, the host CPU can move to another processing function without waiting for process operation completion in the CPU 12.

As described above, according to the present invention, the provision of the dual port RAM 10 between the host CPU in the host system 100 and the CPU 12 makes one I/O operation in the viewpoint of the host CPU complete at high-speed without waiting for process completion of the CPU 12 in the PC card 21, and enables the host CPU to move to another processing. Therefore, processing function speed, as a whole system composed of the host system 100 and PC card 21, is upgraded.

In addition, although, in FIG. 1, both of the known I/O register 9 and the dual port RAM 10 according to the present invention are illustrated, the I/O register 9 is not essential. Furthermore, of the I/O register 9 and dual port RAM 10 is used for the I/O operation, it can be selectable in time of the PC card 21. The PC card 51 according to the present invention can be used in the configuration a known host system 100 where only configuration using the I/O register 9 is available. Therefore, general versatility of the PC card 21 can be increased.

EMBODIMENT 2

Figure 2:
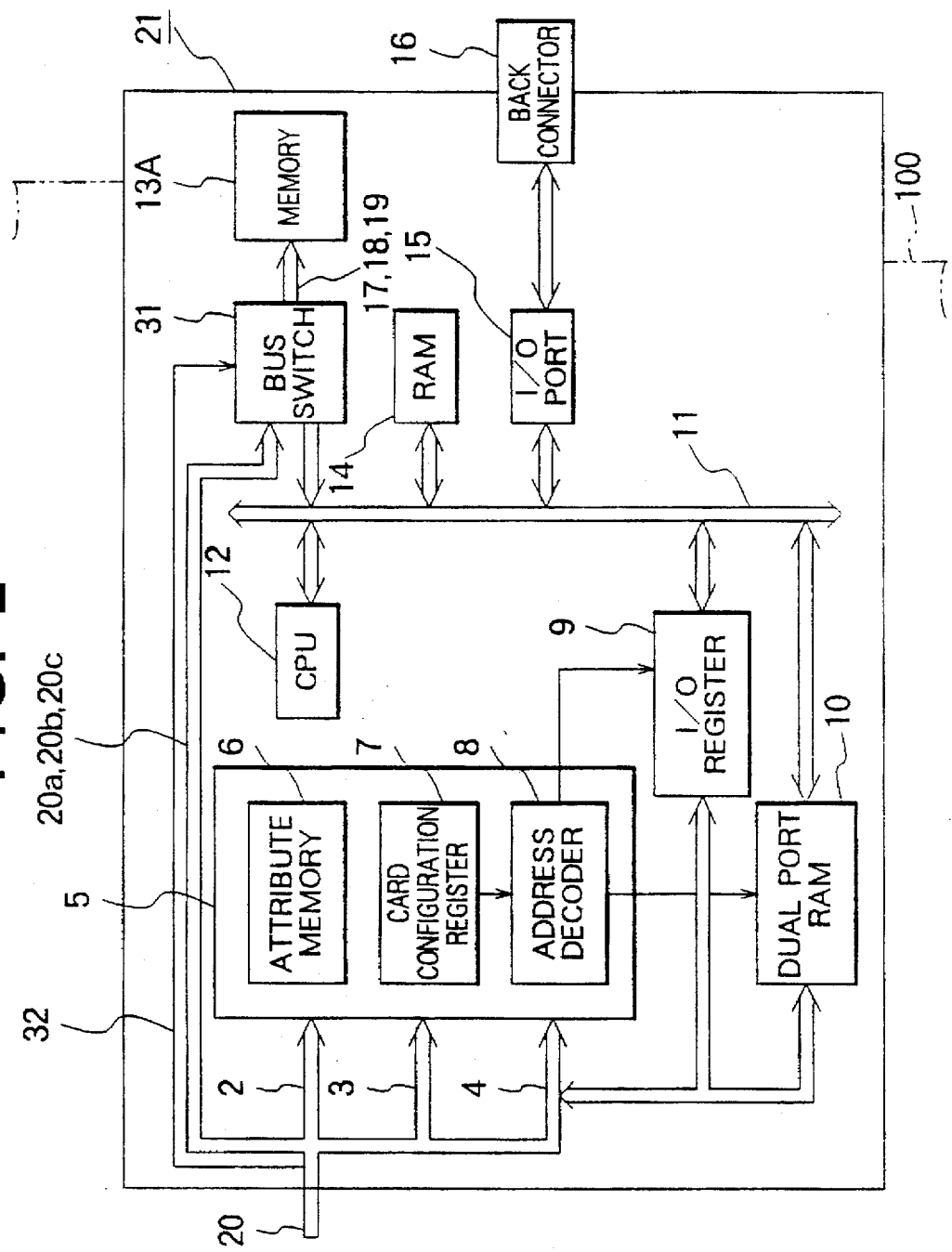
FIG. 2 is a block diagram showing the structure of a PC card according to a second embodiment of the present invention.
Figure 3:
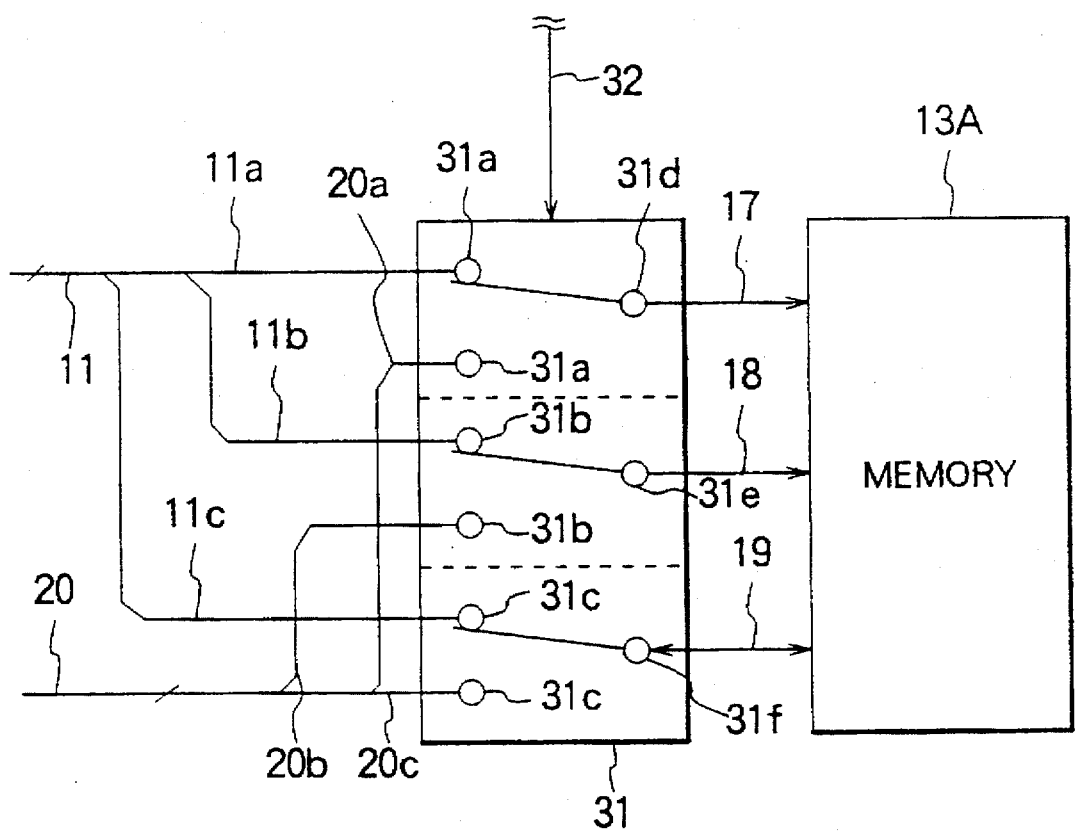
FIG. 3 is a partially enlarged diagram showing the memory and bus switch in FIG. 2.

FIG. 2 is a block diagram showing the structure of a second embodiment of the present invention, and FIG. 3 is a detailed diagram of a bus switch utilized in the second embodiment illustrated in FIG. 2. In this embodiment, nonvolatile memory 13A is provided, which is composed of electrically readable, writable and erasable memory such as flash memory or EEPROM, instead of the ROM 13 in FIG. 1. This change results in that the contents of the nonvolatile memory 13A can be rewritten by the host system 100. In addition, as shown in FIG. 3, a bus switch 31, which is connected to the inner card bus 11 and host CPU bus 20 and serves as switching means for switching between both of the buses, namely for switching connecting/disconnecting between the host CPU bus 20 and the nonvolatile memory 13A, is connected to the nonvolatile memory 13A through an address input 17, a control input 18, and a data input 19. In this embodiment, the host CPU bus 20 includes an address bus 20a, a control bus 20b, a data bus 20c, and a below-described signal line 32 in addition to the address bus 2, control bus 3, and data bus 4.

In this embodiment, the address bus 20a, control bus 20b, and data bus 20c comprise dedicated rewriting means for connecting the nonvolatile memory 13A to the interface means comprised of the connector 1a and PC card interface circuit 5, and rewriting the contents of the nonvolatile memory 13A through the interface means under the control of the host system 100. In addition, in this embodiment, the switching means comprises the above-described bus switch 31, switching between the card inner bus 11 and host CPU bus 20, for connecting one of them to the nonvolatile memory 13A. Alternatively, the switching means may comprise a switch simply switching between connecting/disconnecting between the host CPU bus and nonvolatile memory 13A. In addition, in that case, a prohibiting means for prohibiting access from the card inner bus 11 may be provided, when needed.

The inner card bus 11 comprises an address bus 11a, a control bus 11b, and a data bus 11c. As shown in FIG. 3, the bus switch 31 comprises a plurality of switches having input terminals 31a and 31b and I/O terminal 31c, to which the above-described address buses 20a and 11a, control buses 20b and 11b, and data buses 20c and 11c are connected. Further, output terminals 31d and 31e and an I/O terminal 31f are connected to the address input 17, control input 18, and data input 19. Here, the bus switch 31 or the switch 31 comprises three switches corresponding to the address buses 20a and 11a, control buses 20b and 11b, and data buses 20c and 11c for simplification of the drawing. However, actually, the bus switch 31 comprises any number of switches corresponding to the particular application.

The bus switch 31 is provided with a signal line 32 that is a first switching-control-signal output means for outputting a switching control signal under the control of the host system 100. The switching control signal switches the bus switch 31. The bus switch 31 performs switching with the switching control signal input from the host system 100 through the signal line 32. In addition, the first switching-control-signal output means may be designed so that the switching control signal may be output with the other method except the control of the host system 100. Further, if, in case of using control of the host system 100, the switching control signal is output only when a predetermined identification code is input through the signal line 32 from the host system 100, it can be prevented that the contents of the nonvolatile memory 13A are unintentionally rewritten due to an operational mistake and the like. The residual structure is similar to the above-described first embodiment, and hence description regarding it is omitted.

Operation of the embodiment is described subsequently. In this embodiment, as shown in FIG. 2, the address input 17, control input 18, and data input 19 in the nonvolatile memory 13A are usually connected to the card inner bus 11 by the bus switch 31, and are accessed through the card inner bus 11. However, if updated versions of the software for the PC card 21 become necessary, the host system 100 inputs the switching control signal to the bus switch 31 through the signal line 32 serving as the first switching-control-signal output means. Therefore, the bus switch 31 switches to the address bus 20a, control bus 20b, and data bus 20c. Further, the host system 100 directly accesses the nonvolatile memory 13A to rewrite the instruction codes (operating program) for the CPU 12 that is stored in the nonvolatile memory 13A.

As described above, according to this embodiment, the contents of the nonvolatile memory 13A storing the operating program for the PC card 21 can be easily rewritten without dismantling the PC card 21, by storing the instruction codes (operating program) for the CPU 12 in the PC card 21 in the nonvolatile memory 13A that is electrically rewritable, and by enabling the input terminals 31a and 31b, and I/O terminal 31c, which are connected to the nonvolatile memory 13A, to be switched to the host CPU bus 20 by the bus switch 31.

EMBODIMENT 3

Figure 4:
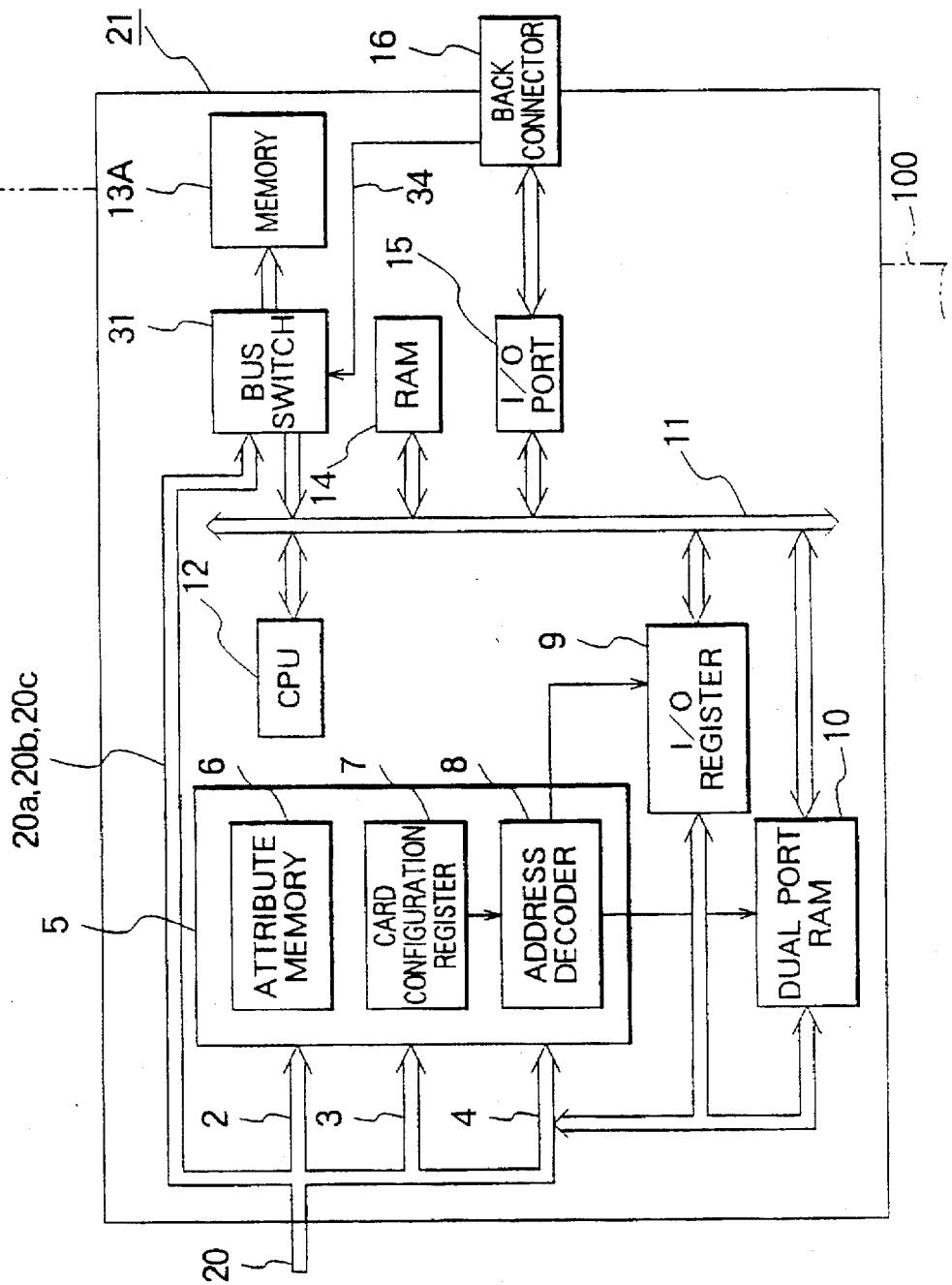
FIG. 4 is a block diagram showing the structure of a PC card according to a third embodiment of the present invention.
Figure 5:
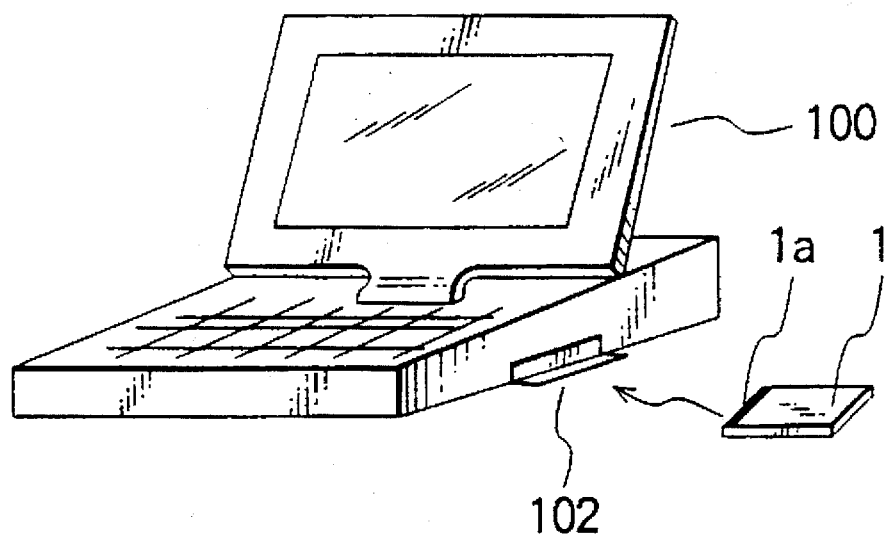
FIG. 5 is a schematic perspective diagram showing a privately known PC card system composed of a host system and a PC card.

FIG. 4 shows a modified example of the above-described second embodiment. In the above-described second embodiment, the switching control signal output means 32 is described as the signal line 32 connected between the host system 100 and bus switch 31. However, in this embodiment, as shown in FIG. 4, a back connector 16 and the bus switch 31 are connected through the signal line 34, and using a free pin (not shown) of the back connector 16, the switching control signal for switching the bus switch 31 is input from the outside through the free pin and the signal line 34. Therefore, second switching-control-signal output means disposed in this embodiment comprises the free pin of the back connector 16 and the signal line 34. In addition, the free pin of the back connector 16 comprises input means for receiving an external signal. The residual structure is similar to the above-described second embodiment, and hence description regarding it is omitted.

Originally, the contents of the nonvolatile memory 13A storing the operating program for the CPU 12 in the PC card 21 should not be frequently rewritten, and troubles caused by end-user's writing error may happen. Therefore, it should be configured such that end-users cannot rewrite the contents. Then, as shown in this embodiment, the PC card is designed so that a signal is input from the free pin of the back connector 16, a special jig, such as a special connector in which a free pin which is usually free is not free, becomes necessary when contents of the nonvolatile memory 13A are written. Therefore, easy rewriting by end-users and troubles due to rewriting errors can be prevented.

According to the above-mentioned first aspect of the present invention, when the host system inputs all of the information necessary for an I/O operation to the dual port RAM at one time, processing of the I/O operation is transferred to the CPU in the PC card. The CPU in the PC card sequentially accesses the dual port RAM receiving the information, and advances processing while reading the information necessary for the I/O operation. In this time, since the host system has already input all of the information necessary for one I/O operation to the dual port RAM, the host system can move to another processing further without waiting processing completion of the CPU in the PC card. Therefore, the CPU can make one complete I/O operation in the viewpoint of the host CPU in shorter time, and hence the processing speed of the whole system can be upgraded.

According to the second aspect of the present invention, since the memory storing the operating program for the CPU in the PC card comprises the nonvolatile memory that is electrically rewriteable, the operating program can be rewritten with the dedicated rewriting means under the control of the host system without dismantling the PC card even if updated version of the operating program for the CPU become necessary after shipping.

According to the third aspect of the present invention, by switching connecting/disconnecting (make and break of connection) between the dedicated rewriting means and the memory with the switching means, permission and prohibition of rewriting of the operating program in the memory by the host system are controlled. Therefore, if switching by means of the switching means is not performed, the operating program usually cannot be rewritten, and hence rewriting of the operating program caused by malfunction can be prevented.

According to the fourth aspect of the present invention, the first switching control signal output means outputs a switching control signal to the switching means under the control of the host system, and thereby the switching means switches between connecting/disconnecting. Therefore, for example, if the PC card is designed so that the switching is performed only when a predetermined identification code is input it can be prevented that the operating program is inadvertently rewritten. In contrast, if such an identification code is not set, the switching can be easily done. Hence, security and convenience of the PC card can be increased by setting the host system to the conditions corresponding to the working conditions.

According to the fifth aspect of the present invention, an external signal is input the input means provided in second switching control signal output means, and thereby the switching control signal is output to the switching means according to the external signal input to the input means. Therefore, in comparison with switching under the control of the host system, rewriting of the operating program caused by malfunction can be prevented.

According to the sixth aspect of the present invention, the PC card is provided with a back connector for connection to external communication equipment, and a free pin of the back connector comprises input means for inputting an external signal to the switching control signal output means. Therefore, using a special jig such as a special connector that a usually free pin is not free, the signal is input, and hence easy rewriting by end-users and troubles due to rewriting errors can be prevented.

What is claimed is:

1. A PC card comprising:
    a CPU;
    a nonvolatile, rewriteable memory for storing an operating program for said CPU;
    interface means connectable to a host system for configuring the PC card under control of the host system and for exchanging data with the host system;
    a bus connected to said interface means and connectable to said memory for rewriting the operating program in said memory under control of the host system;
    switching means connected between and to said bus and said memory for selectively connecting said memory to said bus and disconnecting said memory from said bus; and
    a dual port RAM connected between said CPU and said interface means for storing at one time all data input from and output to the host system through said interface means, wherein the data stored in said dual port RAM is accessed sequentially by said CPU.

2. The PC card according to claim 1, comprising first switching-control-signal output means for outputting a switching control signal to said switching means under control of the host system.

3. The PC card according to claim 1 comprising:
    input means for receiving an external signal input from a source external to said PC card; and
    second switching-control-signal output means connected between and to said input means and said switching means for supplying a switching control signal to said switching means according to the external signal input to said input means.

4. The PC card according to claim 3 wherein said PC card comprises a back connector including said input means.

5. A PC card system comprising:
    a host system; and
    a PC card including:
        interface means connected to said host system for configuring said PC card under control of said host system and for exchanging data with said host system;
        a CPU;
        a nonvolatile, rewriteable memory for storing an operating program for said CPU;
        a bus connected to said interface means and connectable to said memory for rewriting the operating program in said memory under control of the host system;
        switching means connected between and to said bus and said memory for selectively connecting said memory to said bus and disconnecting said memory from said bus; and a dual port RAM connected between said CPU and said interface means for storing at a single time all data input from and output to said host system through said interface means, wherein the data stored in said dual port RAM is accessed sequentially by said CPU.

6. The PC card system according claim 5 wherein said PC card comprises first switching-control-signal output means for outputting a switching control signal to said switching means under control of said host system.

7. The PC card system according claim 5 wherein said PC card comprises:

input means for receiving an external signal input from a source external to said PC card; and second switching-control-signal output means connected between and to said input means and said switching means for supplying a switching control signal to said switching means according to the external signal input to said input means.

8. The PC card system according to claim 7 wherein said PC card comprises a back connector including said input means.

\* \* \* \* \*